United States Patent [19]
Bassett

[11] Patent Number: 6,049,520
[45] Date of Patent: Apr. 11, 2000

[54] DRIVE MECHANISM FOR ROTATING STORAGE MEDIA

[75] Inventor: Steven Bassett, Fort Collins, Colo.

[73] Assignee: LSI Logic Corporation, Milpitas, Calif.

[21] Appl. No.: 09/000,688

[22] Filed: Dec. 30, 1997

[51] Int. Cl.$^7$ .................................................. G11B 23/00
[52] U.S. Cl. .......................................................... 369/266
[58] Field of Search ................................... 369/191–192, 369/266–267, 34, 36, 178; 360/98.01–98.08, 99.08

[56] References Cited

U.S. PATENT DOCUMENTS

| | | | |
|---|---|---|---|
| 4,783,717 | 11/1988 | Zeeman | 369/266 |
| 4,926,082 | 5/1990 | Barnes | 310/90.5 |
| 5,012,359 | 4/1991 | Kohno et al. | 360/71 |
| 5,469,006 | 11/1995 | Pinkerton | 310/90.5 |
| 5,495,221 | 2/1996 | Post | 335/299 |
| 5,561,658 | 10/1996 | Nakamichi et al. | 369/267 |
| 5,598,048 | 1/1997 | Dunfield et al. | 310/90.5 |
| 5,761,016 | 6/1998 | Watanabe | 369/291 |
| 5,822,296 | 10/1998 | Nakamichi | 369/192 |
| 5,845,195 | 12/1998 | Miodownik et al. | 360/135 |
| 5,881,045 | 3/1999 | Inoue | 369/192 |

OTHER PUBLICATIONS

Flexible–disk Magnetic Memory; R. Kaneko et al.; IEEE Transactions on Magnetics; vol. Mag–8, No. 3, p. 607; Sep. 1972.

Magnetic Bearings for a High–Performance Optical Disk Buffer; R. Hockney et al.; Proceedings of the SPIE—The International Society for Optical Engineering; vol. 899; p. 46–53; 1988.

Magnetic Bearing Momentum Wheels with Magnetic Gimballing Capability for 3–Axis Active Attitude Control and Energy Storage; R.S. Sindlinger; First International Conference on Attitude and Orbit Control Systems; p. 395–401; 1977.

Primary Examiner—Allen T. Cao

[57] ABSTRACT

A drive mechanism in a data storage apparatus for positioning and rotating a two-sided data storage medium. The drive mechanism includes at least one repeller adjacent each side of the data storage medium repelling at least one control element on the data storage medium thereby positioning the data storage medium. The drive mechanism also includes a plurality of driver elements located adjacent the data storage medium. Each of the driver elements is capable of selectably attracting or repelling the at least one control element on the data storage medium thereby causing the data storage medium to rotate while the data storage medium is positioned by the at least one repeller. Also disclosed is a method of positioning and rotating a two-sided data storage medium by repelling at least one control element on the data storage medium thereby positioning the storage medium substantially in a pre-determined position for rotating the data storage medium, and selectably attracting and repelling the at least one control element on the data storage medium thereby causing the data storage medium to rotate while the data storage medium is substantially maintained in the pre-determined position.

40 Claims, 4 Drawing Sheets

DRIVE MECHANISM FOR ROTATING STORAGE MEDIA

The present invention relates generally to mechanisms for rotating data storage media, and more specifically relates to a drive mechanism for positioning, rotating and centering a two-sided data storage medium.

BACKGROUND

Devices for reading data from a data storage disc, such as a CD-ROM drive for reading data from a CD-ROM, are typically designed such that the data storage disc is first placed in a disc caddy or a sliding tray. After the data storage disc is so placed, the disc caddy or sliding tray conveys the data storage disc to a driving mechanism and continues to support the data storage disc until the driving mechanism begins rotating the data storage disc at which time data is read from the data storage disc.

A typical driving mechanism for driving the rotation of the data storage disc includes a motor-driven chuck and spindle assembly where the chuck holds the data storage disc by retaining a center hole in the data storage disc. After the chuck has retained the data storage disc using the center hole, the chuck and spindle assembly rotate thereby causing rotation of the data storage disc. As the data storage disc is rotating, a data head capable of reading from the disc is positioned along a radius to read data from data tracks on the data storage disc, and a focus actuator in communication with the data reading head continuously adjusts the distance between the data reading head and the data storage disc so that the data reading head remains focused on the data and can successfully read the data from the data storage disc even if the data storage disc is not rotating perfectly.

The above-described data reading device, and driving mechanism thereof, has several disadvantages. For example, regardless of whether a disc caddy or sliding tray is used to convey the data storage disc to the driving mechanism, the spindle and chuck assembly, as well as the motor to drive same, must be positioned either above or below the data storage disc so that the data storage disc can be engaged by the chuck and rotated. This arrangement limits the minimum height to which the data reading device can be minimized. It is often desirable to minimize the area occupied by a data reading device because, among other reasons, such devices are presently widely used in portable computer applications.

Further, the center hole of the data storage disc, and the data storage disc itself, necessarily have design tolerances and these design tolerances can hinder the efficient operation of the data reading device. For example, an imperfect center hole, even within acceptable design tolerances, can cause the data storage disc to periodically vibrate as the data storage disc is rotated by the chuck and spindle assembly of the drive mechanism. Such vibration causes the data reading head to oscillate along the sled as it works to follow a specific data track. If the vibration of the data storage disc is adequately severe, the vibration can cause the data reading head to fail to follow the specific data track.

Moreover, if the data storage disc is chucked at even only a slight angle relative to the plane of the data reading head, the data storage disc will tend to oscillate above the head as it rotates. Such an oscillation will cause the focus actuator to also oscillate as it works to keep the data reading head focused on the data. If the oscillation of the data storage disc is adequately severe, the oscillation of the data storage disc can prevent the focus actuator from maintaining the head focused on the data.

Additionally, the data reading device necessitates initial physical contact of the data storage disc with either a disc caddy or a sliding tray, and subsequent physical contact of the data storage disc with a chuck. Physical contact with the data storage disc can cause the data storage disc to become scratched or otherwise damaged and cause some of the data stored on the data storage disc to become inaccessible.

The above-discussed disadvantages are also generally applicable to data write devices.

For the foregoing and other reasons, there is a need for an improved drive mechanism for rotating data storage media, such as a data storage disc. The present invention provides a novel drive mechanism which alleviates the problems discussed above.

OBJECTS AND SUMMARY

Therefore, an object of the present invention is to provide a drive mechanism which decreases the area required to be occupied by a data reading (or writing) device.

Another object of the present invention is to provide a drive mechanism which can accommodate design tolerances of a data storage disc.

A further object of the present invention is to provide a drive mechanism which can position a data storage disc for subsequent rotation without requiring physical contact therewith.

A still further object of the present invention is to provide a drive mechanism which can rotate a data storage disc without requiring physical contact therewith.

In accordance with these and other objects, the present invention provides a drive mechanism in a data storage apparatus for positioning and rotating a two-sided data storage medium having a least one control element thereon. Desirably, the data storage medium is a two-sided, removable data storage disc. In a preferred embodiment, the drive mechanism includes two pairs of magnetic bearings, and each pair of magnetic bearings is adjacent a respective side of the data storage medium so that the data storage medium is held in position by the magnetic forces applied by the magnetic bearings to at least one control element. Desirably, the magnetic forces applied by the magnetic bearings are repelling forces. However, the magnetic bearings may instead apply attractive forces. Any suitable magnetic or non-magnetic repeller or attracter may be used to apply either a repelling or attractive force to the data storage medium.

The drive mechanism also includes a plurality of driver elements adjacent the data storage medium. Preferably, a plurality of stationary electromagnetic driver elements are adjacent the circumference of the data storage disc, and each of the stationary electromagnetic driver elements is capable of selectably attracting or repelling the at least one control element on the data storage medium thereby causing the data storage medium to rotate while the date storage medium is positioned by the one or more magnetic bearings and is substantially centered by at least two of the electromagnetic driver elements.

Preferably, the magnetic band on the data storage disc includes a plurality of spaced-apart concentrated permanent magnetic elements, and the electromagnetic driver elements are spaced-apart from each other in a spacing arrangement different from that of the concentrated permanent magnetic elements of the magnetic band on the data storage disc. The at least one magnetic bearing element adjacent each side of the data storage disc exerts opposing forces on the concentrated permanent magnetic elements of the magnetic band on the data storage disc thereby creating a magnetic bearing on which the data storage disc can move and rotate.

The electromagnetic driver elements are preferably controlled by a variable electric current such that the magnetic field generated by the electromagnetic driver elements can be modulated to cause the data storage disc to rotate. At least one of the electromagnetic driver elements is positioned and is chargeable for attracting at least one of the concentrated permanent magnetic elements of the magnetic band on the data storage disc such that the data storage disc can be magnetically pulled substantially into a pre-determined position for rotation thereof. Also, at least one of the electromagnetic driver elements is positioned and is chargeable for attracting at least one of the concentrated permanent magnetic elements of the magnetic band on the data storage disc such that the data storage disc can be magnetically braked and the rotation thereof limited. Still further, at least one of the electromagnetic driver elements is positioned and is chargeable for repelling at least one of the concentrated permanent magnetic elements of the magnetic band on the data storage disc such that the data storage disc can be magnetically pushed from the pre-determined position.

Still further, the present invention may include a method of positioning and rotating a two-sided data storage medium by applying a magnetic force to at least one control element on the data storage medium thereby positioning the storage medium substantially in a pre-determined position for rotating the data storage medium, and selectably attracting and/or repelling the at least one control element on the data storage medium thereby causing the data storage medium to rotate while the data storage medium is substantially maintained in the pre-determined position.

Preferably, the at least one control element on the data storage medium includes a plurality of permanent magnetic elements spaced-apart from each other in a spacing arrangement different from that of the permanent magnetic elements on the data storage medium; and the method further includes charging at least one of the electromagnetic elements to attract at least one of the permanent magnetic elements on the data storage medium such that the data storage medium is magnetically pulled substantially into a pre-determined position for rotation thereof. To selectably attract and/or repel the permanent magnetic elements on the data storage medium, variable electric currents are used to control a plurality of electromagnetic driver elements located adjacent the data storage medium such that the magnetic fields generated by the electromagnetic driver elements can be modulated to cause the data storage medium to rotate.

The method further may also include charging at least one of the electromagnetic elements to attract at least one of the permanent magnetic elements on the data storage medium such that the data storage medium is magnetically braked and the rotation thereof limited, and includes charging at least one of the electromagnetic elements to repel at least one of the permanent magnetic elements on the data storage medium such that the data storage medium is magnetically pushed from the pre-determined position.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION OF AN EMBODIMENT OF THE INVENTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
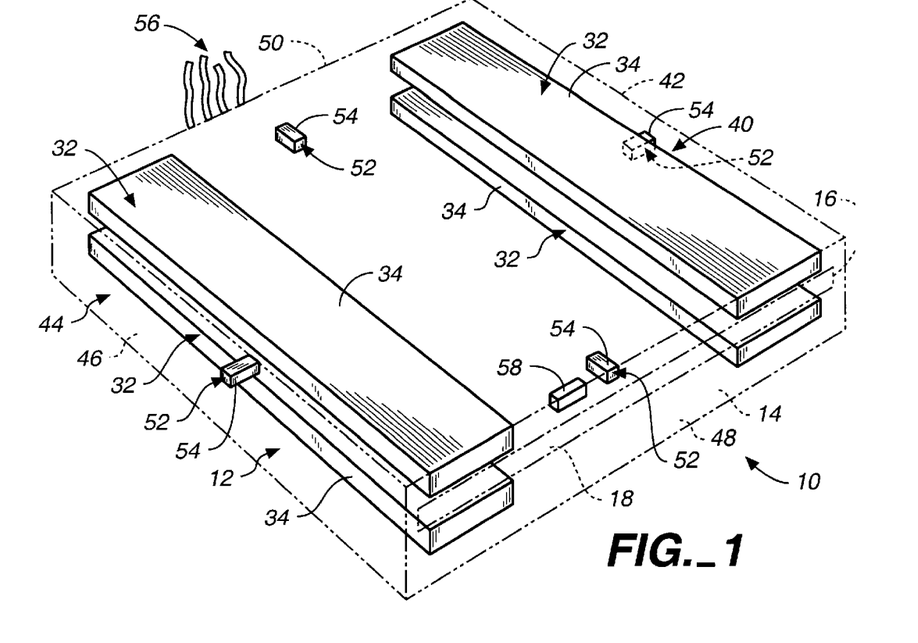
FIG. 1 is a perspective view, schematic in nature, of a data storage apparatus, illustrating a housing thereof in phantom and a drive mechanism in accordance with a preferred embodiment of the present invention within the housing.

FIGS. 1–8 illustrate a data storage apparatus 10 including a drive mechanism 12 in accordance with a preferred embodiment of the present invention. As shown in FIG. 1, the data storage apparatus 10 preferably includes a housing 14 that defines an opening to 16, and a door 18 for covering the opening 16. The door 18 is adapted to open so that a data storage medium 20, such as a removable data storage disc 22, can be inserted into the housing 14 and brought into engagement with the drive mechanism 12 inside the housing 14, as illustrated, for example, by FIGS. 2a–8. Desirably, there is a sensor 58 in the housing 14 for sensing when a data storage disc 22 is inserted through the door 18. The sensor 58 may, for example, comprise one or more diodes which optically detect that a data storage disc 22 is being inserted into the data storage apparatus 10. Alternatively, the sensor 58 may be some type of magnetic sensor which senses the magnetic band of the data storage disc 22. After the data storage disc 22 is received by the data storage apparatus 10, the data storage disc 22 is rotated while a data reader (not shown) reads data from (or while a data writer writes data to) the data storage disc 22. The data reader may be in any suitable form, such as, for example, a conventional sled/head assembly.

Although the embodiment of the invention illustrated in FIGS. 1–8 includes the door 18 and the removable data storage disc 22, the data storage apparatus 10 in an alternative embodiment may instead use a non-removable data storage medium and does not require the door 18. For example, the data storage apparatus 10 may be a rigid, magnetic disc drive.

As illustrated by FIGS. 2a–8, the data storage disc 22 desirably includes a control element 24. Preferably, the control element 24 is a magnetic band 26 around the circumference of the data storage disc 22 that includes permanent magnetic material 28 throughout and has relatively stronger, evenly spaced-apart, permanent magnetic portions, or point elements 30. The magnetic band may include any suitable number of point elements 30 and any suitable spacing therebetween, depending on the specific application in which the present invention is used. Therefore, while a certain number of point elements 30 and spacing therebetween is depicted in the drawings, the invention, of course, is not so limited.

The magnetic band 26 can be provided already manufactured into the data storage disc 22, or may be applied at a later time by, for example, the consumer. In this case, it is envisioned that the magnetic band 26 may be applied by the consumer directly to the circumferential edge of any of the presently widely commercially available CD-Rom's, music CD's or DVD discs for use with the drive mechanism 12 in accordance with the present invention.

In accordance with the present invention, the drive mechanism 12 includes at least one magnetic means 32, such as a permanent magnetic bearing plate 34, located adjacent each side 36, 38 of the data storage disc 22 when the data storage disc 22 is engaged with the data storage apparatus 10. The drive mechanism 12 desirably also includes one pair 40 of opposing spaced-apart, parallel permanent magnetic bearing plates 34 adjacent the right side 42 of the housing 14, and includes another pair 44 of opposing spaced-apart, parallel permanent magnetic bearing plates 34 adjacent the left side 46 of the housing 14. Desirably, each of the permanent magnetic bearing plates 34 is magnetized with the same magnetic polarity, and is of the same magnetic polarity as the point elements 30 of the magnetic band 26 on the data storage disc 22. Therefore, each of the permanent magnetic bearing plates 34 apply a repelling force to the magnetic band 26 on the data storage disc 22. However, an alternative embodiment of the present invention may provide that each of the permanent magnetic bearing plates 34 is magnetized with the opposite magnetic polarity as the point elements 30 of the magnetic band 26 on the data storage disc 22. Therefore, each of the permanent magnetic bearing plates 34 would apply an attracting force to the magnetic band 26 on the data storage disc 22. It is also possible to provide for means other than magnets to attract or repel the magnetic storage disc 22.

Additionally, while two pairs 40 and 44 of permanent magnetic bearing plates 34 in a specific arrangement are depicted and described, the shape, size and positioning of the magnetic means 32 are not limited thereto, and variations thereof are certainly within the scope of the present invention. Additionally, if desired, permanent magnetic bearing plates 34 may also be positioned in the housing 14 along the front 48 and rear 50 thereof; or one doughnut-shaped permanent magnetic bearing plate 34 may be provided over the data storage disc 22, and another may be provided under the data storage disc 22. Still further, one permanent magnet may be provided where the magnet is positioned adjacent one side of the data storage disc 22 and extends to adjacent the other side of the data storage disc 22. Hence, a single permanent magnetic bearing may be used to position the data storage disc 22.

Figure 2A:
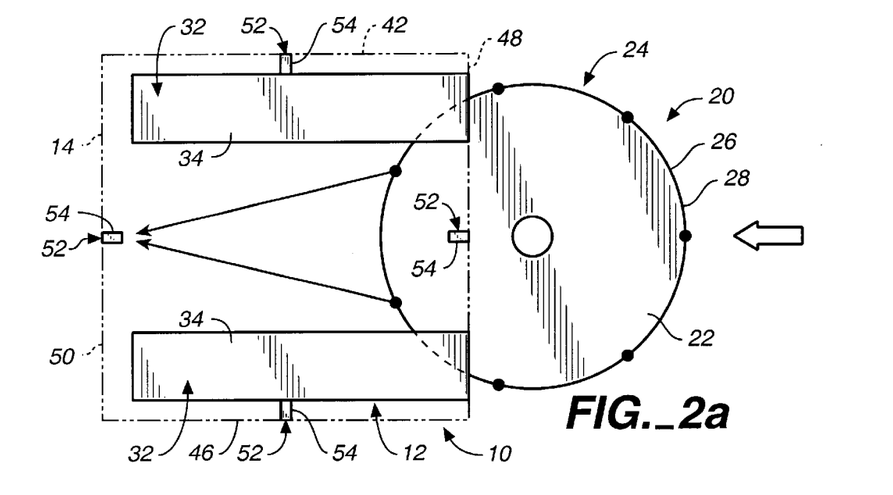
FIG. 2a is a top, plan view of the data storage apparatus of FIG. 1, illustrating with arrows the drive mechanism receiving a removable disc storage medium.
Figure 2B:
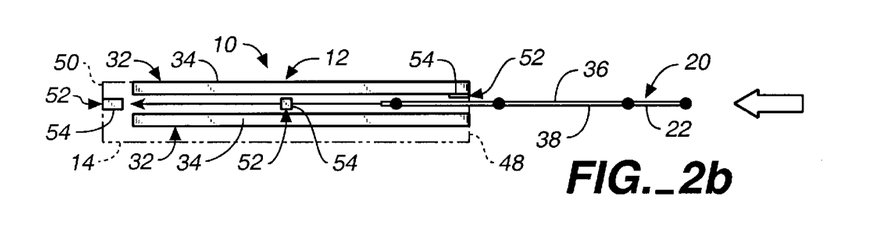
FIG. 2b is a side, elevational view of the data storage apparatus of FIG. 1, illustrating with arrows the drive mechanism receiving a removable disc storage medium.

When the data storage disc 22 is inserted into the opening 16 of the data storage apparatus as shown in FIGS. 2a and 2b, the data storage disc 22 is repelled by the permanent magnetic bearing plates 34 and is urged into a substantially level position between each pair 40 and 44 of permanent magnetic bearing plates 34. The permanent magnetic bearing plates 34 exert opposing forces on the magnetic band 26 and prevent the data storage disc 22 from contacting any internal structure of the data storage apparatus 10.

When the data storage disc 22 is fully received by the data storage apparatus 10 as shown in FIGS. 3a–6, the permanent magnetic bearing plates 34 magnetically suspend the data storage disc 22 on a magnetic bearing between each pair 40 and 44 of the permanent magnetic bearing plates 34, and provide a nominally flat surface on which the data storage disc 22 can rotate.

Figure 8:
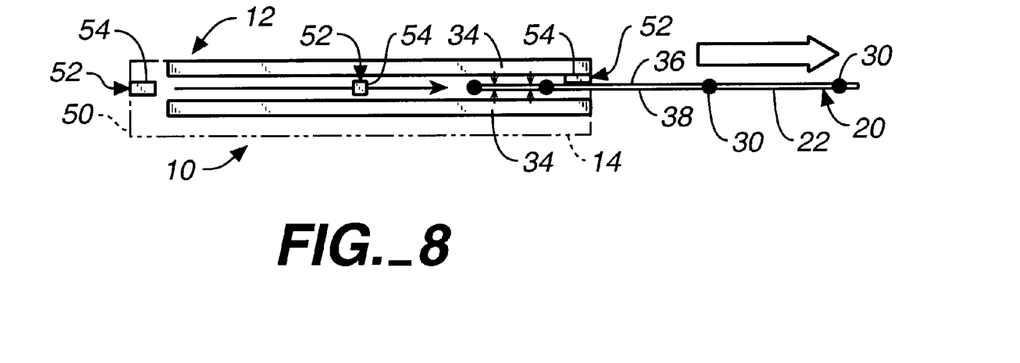
FIG. 8 is a side, elevational view, similar to FIGS. 2b and 3b, of the data storage apparatus of FIG. 1, wherein all the permanent magnetic bearings are omitted for clarity, and illustrating with arrows the drive mechanism ejecting the removable disc storage medium.

Much like when the data storage disc 22 is inserted in the data storage apparatus 10, when the data storage disc 22 is ejected from the data storage apparatus 10 as shown in FIG. 8, the permanent magnetic bearing plates 34 continue to exert opposing forces on the magnetic band 26 and therefore prevent the data storage disc 22 from contacting any internal structure of the data storage apparatus 10 as the data storage disc 22 is being ejected.

As illustrated in FIGS. 1–8, the drive mechanism 12 in accordance with the present invention also includes a plurality of driver elements 52 located adjacent the data storage disc 20 when the data storage disc 20 is fully received by the data storage apparatus 10 as shown in FIGS. 3a–7. Preferably, the driver elements 52 are spaced-apart, stationary electromagnetic driver elements 54 located around the perimeter of the fully received data storage disc 22, and are controlled by a variable electric current such that the magnetic field generated by the electromagnetic driver elements 54 can be modulated to cause the data storage disc 22 to rotate as described hereinafter. To this end, the data storage apparatus 10 may be provided with a plurality of electromagnetic driver current in lines 56 for supplying electric currents to the electromagnetic driver elements 54.

While the drawings depict four electromagnetic driver elements 54 positioned approximately ninety degrees apart from one another with one at each of the front 48, rear 50, right 42 and left 46 sides of the housing 14, the present invention is not limited to such a configuration. Rather, the number and positioning of driver elements 52 utilized will inevitably depend on the specific application in which the present invention is used. In fact, depending on the application, additional driver elements 52 may be needed in order to keep the data storage disc 22 substantially centered during rotation. Alternatively, if desired, some type of chuck or bearing insertable through a center hole of the data storage disc 22 may be utilized in order to keep the data storage disc 22 substantially centered.

Several aspects of the operation of the drive mechanism 12 of the illustrated data storage apparatus 10 will now be more specifically described. Initially, as shown in FIGS. 2a and 2b, a removable data storage medium 20, such as a removable data storage disc 22 including the above-described magnetic band 26, is inserted through the door 18 into the opening 16 of the housing 14.

Figure 3A:
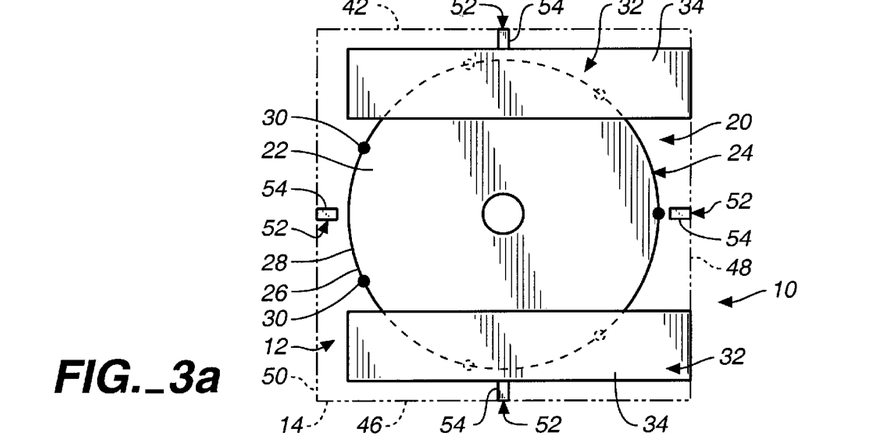
FIG. 3a is a top, plan view, similar to FIG. 2a, of the data storage apparatus of FIG. 1, illustrating the removable disc storage medium fully received by the drive mechanism.
Figure 3B:
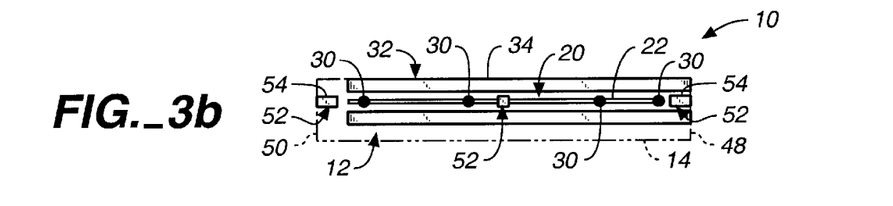
FIG. 3b is a side, elevational view, similar to FIG. 2b, of the data storage apparatus of FIG. 1, illustrating the removable disc storage medium fully received by the drive mechanism.
Figure 3C:
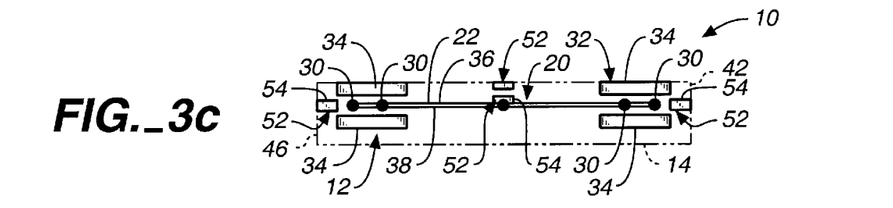
FIG. 3c is a front, elevational view of the data storage apparatus of FIG. 1, illustrating the removable disc storage medium fully received by the drive mechanism.

When the data storage disc 22 is inserted, each pair 40 and 44 of permanent magnetic bearing plates 34 exerts opposing forces to the permanent magnetic band 26 of the data storage disc 22. As the data storage disc 22 is inserted, preferably the sensor 58 in the data storage apparatus 10 senses that a data storage disc 22 is being inserted. Regardless of which type of sensor, if any, is used, when a data storage disc 22 is inserted into the data storage apparatus 10, the electromagnetic driver element 54 adjacent the rear 50 of the housing 14, opposite the opening 16, is controlled so as to exert an attractive magnetic force to the permanent magnetic band 26, and specifically one or more of the point elements 30 thereof, so that the data storage disc 22 is pulled into a pre-determined position for rotation, as shown in FIGS. 3a–3c. As shown, preferably the data storage disc 22 is brought to a position substantially centered amongst the electromagnetic driver elements 54 and is suspended by the magnetic forces being applied by the permanent magnetic bearing plates 34. The permanent magnetic bearing plates 34 provide a substantially flat magnetic bearing surface on which the data storage disc 22 can rotate.

After the data storage disc 22 is so positioned, the data storage disc 22 may be rotated and data read therefrom (or data written thereto). Rotation of the data storage disc 22 by the drive mechanism 22 will now be described. To rotate the data storage disc 22, the electromagnetic driver elements 54 are controlled by a variable electric current such that the magnetic fields generated by the electromagnetic driver elements 54 are modulated. The modulation of the magnetic fields causes the data storage disc 22 to rotate. The angular velocity of the data storage disc 22 can be varied by modulating the strength of the magnetic forces applied to the data storage disc 22 by the electromagnetic driver elements 54.

While it was mentioned hereinabove that the number and spacing of the point elements 30 on the magnetic band 26 will be dictated by the specific application, it is preferable that the number of point element 30 and driver elements 52, and their angular relationship, be spaced differently such that the point elements 30 and driver elements 52 are not perfectly aligned, otherwise the data storage disc 22 may be loaded into the data storage apparatus 10 and not be able to be rotated by the driver elements 52, or may caused to rotate in the wrong direction.

Figure 4:
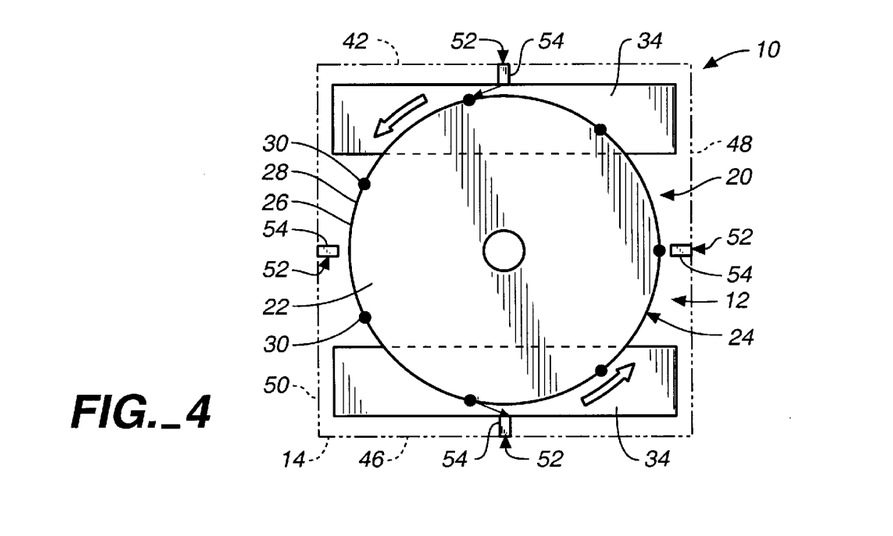
FIG. 4 is a top, plan view, similar to FIGS. 2a and 3a, of the data storage apparatus of FIG. 1, wherein the top permanent magnetic bearings are omitted for clarity, and illustrating with arrows the drive mechanism rotating the removable disc storage medium.

Referring to FIG. 4, rotation of the data storage disc 22 may be initialized by, for example, controlling the electromagnetic driver element 54 adjacent the right side 42 of the housing 14 so that it creates a strong magnetic field equal to the polarity of the closest point element 30 of the magnetic band 26 on the data storage disc 22, thereby pushing this closest point element 30 to the left and imparting a counter-clockwise rotation of the data storage disc 22. At this time, the opposing electromagnetic driver element 54 adjacent the left side 46 of the housing 14 is controlled to create a magnetic field opposite of the polarity of the closest point element 30 of the magnetic band 26 thereby pulling this closest point element 30 to the right and further imparting a counter-clockwise rotation of the data storage disc 22. At the same time, the other electromagnetic driver elements 54 adjacent the front 48 and rear 50 of the housing 14 are controlled so as to either emit no magnetic field or to emit a slight, equal polarity magnetic force in order to keep the data storage disc 22 centered during rotation.

Figure 5:
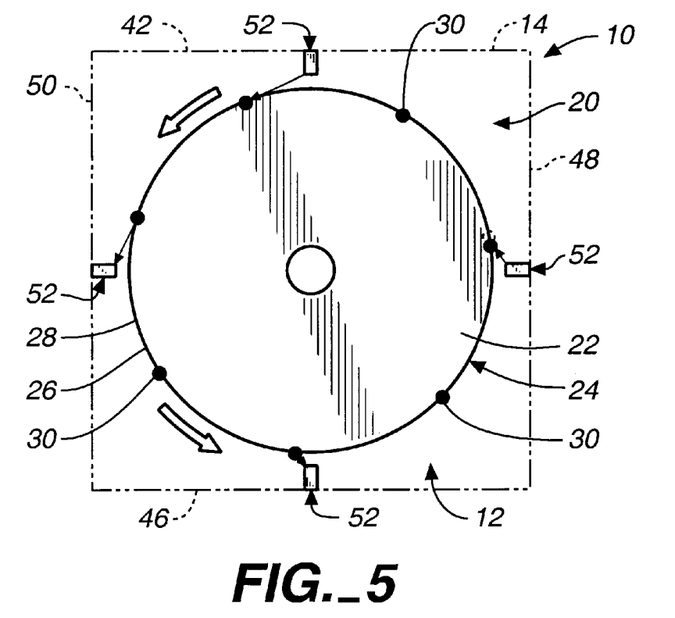
FIG. 5 is another top, plan view, similar to FIGS. 2a, 3a and 4, of the data storage apparatus of FIG. 1, wherein all the permanent magnetic bearings are omitted for clarity, and illustrating with arrows the drive mechanism rotating the removable disc storage medium at a different point in time than is depicted in FIG. 4.
Figure 6:
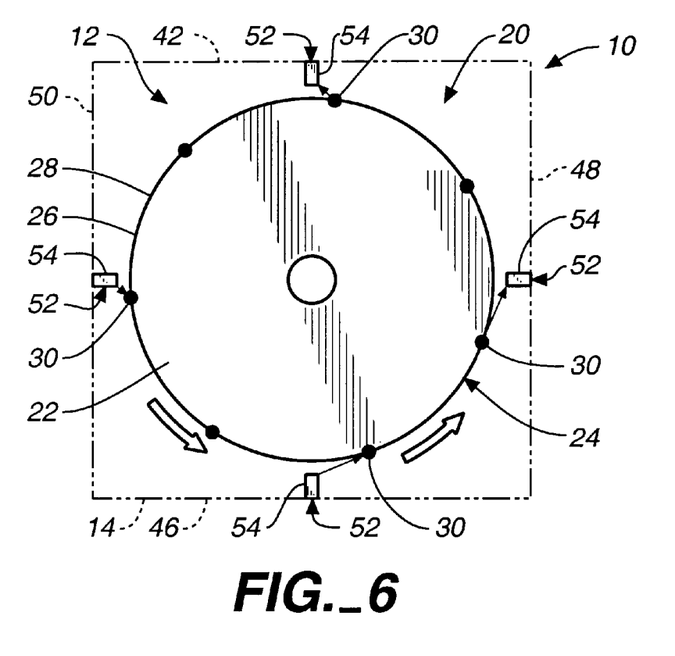
FIG. 6 is yet another top, plan view, similar to FIGS. 2a, 3a, 4 and 5, of the data to storage apparatus of FIG. 1, wherein all the permanent magnetic bearings are omitted for clarity, and illustrating with arrows the drive mechanism rotating the removable disc storage medium at a different point in time than is depicted in FIGS. 4 and 5.

FIGS. 5 and 6 show further examples of the pushing and pulling of the point elements 30 of the magnetic band 26 of the data storage disc 22 by the electromagnetic driver elements 54. Specifically, in FIG. 5, at a slightly later point in time than is depicted in FIG. 4, the electromagnetic driver elements 54 adjacent the left side 46 and the rear 50 of the housing 14 may be controlled to create magnetic fields opposite the polarity of the closest point elements 30, thereby pulling them and imparting a counter-clockwise rotation of the data storage disc 22. At the same time, the electromagnetic driver elements 54 adjacent the front 48 and right side 42 of the housing 14 may be controlled to create magnetic fields having the same polarity of the closest point elements 30, thereby pushing them away and further imparting a counter-clockwise rotation of the data storage disc 22.

In FIG. 6, at a slightly later point of time than is depicted in FIG. 5, the electromagnetic driver elements 54 adjacent the right side 42 and front 48 of the housing 14 ma be controlled to create magnetic fields having an opposite polarity than that of the closest point elements 30, thereby pulling them and imparting a counter-clockwise rotation of the data storage disc 22. At the same time, the electromagnetic driver elements 54 adjacent the left side 46 and the rear 50 of the housing 14 may be controlled to create magnetic fields having the same polarity as the closest point elements 30 thereby pushing them away, and further imparting a counter-clockwise rotation of the data storage disc 22.

If desired, rotation of the data storage disc 22 using the electromagnetic driver elements 54 can be accomplished by controlling the electromagnetic driver elements 54 in a manner different than as was described in reference to FIGS. 4–6. Regardless, the data storage disc 22 can be rotated using magnetic fields and without necessitating actual physical contact therewith using a driven chuck and spindle assembly.

Figure 7:
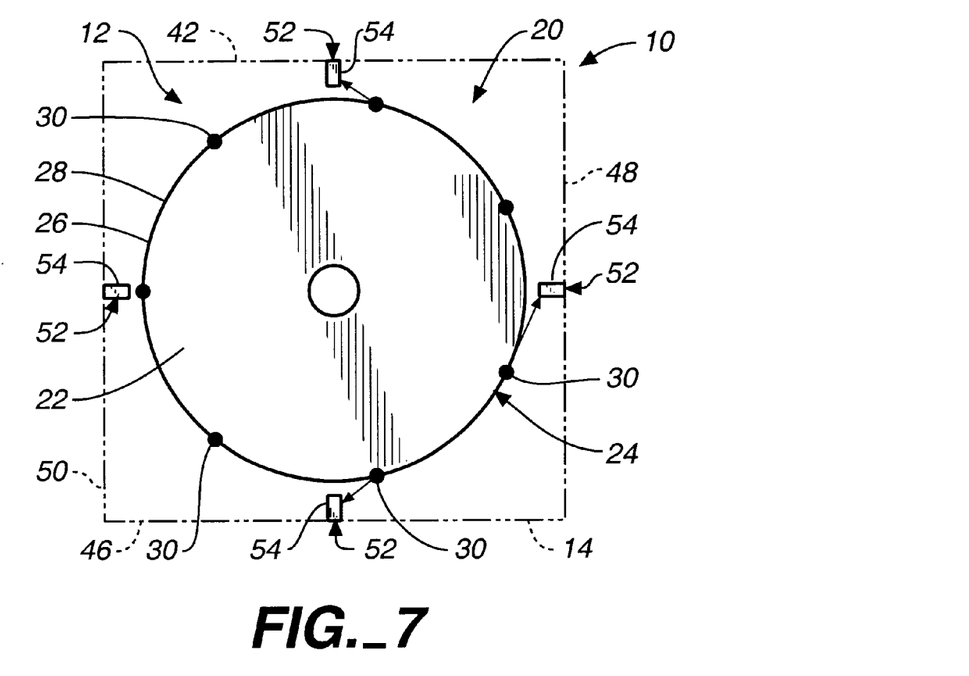
FIG. 7 is a top, plan view, similar to FIGS. 2a, 3a and 4–6, of the data storage apparatus of FIG. 1, wherein all the permanent magnetic bearings are omitted for clarity, and illustrating the drive mechanism braking the rotation of the removable disc storage medium.

After the desired data is read from or written to the data storage disc 22 using a data reader or writer while the data storage disc 22, the data storage disc may be "braked" to limit or stop the rotation, as illustrated by FIG. 7, and thereafter ejected from the data storage apparatus 10. As shown, the electromagnetic driver elements 54 can all be controlled to attract the point elements 30 on the magnetic band 26 of the data storage disc 22 and to directly align a point element 30 with the electromagnetic driver element 54 located adjacent the rear 50 of the housing 14, opposite the opening 16.

After the data storage disc 22 is "braked" by one or more electromagnetic driver elements 54 and the data storage disc 22 stops rotating, the data storage disc 22 can be ejected from the data storage apparatus 10 as shown in FIG. 8. As shown, one way to eject the data storage disc 22 is to control the electromagnetic driver element 54 located adjacent the rear 50 of the housing 14, opposite the opening 16, so as to emit a magnetic field having a magnetic polarity equal to that of the aligned point element 30. As a result, the closest point element 30 is repelled, and the data storage disc 22 is essentially ejected from the data storage apparatus 10.

Preferably, the data storage disc 22 is ejected at least half-way so that a user can grasp the data storage disc 22 and entirely remove same from the data storage apparatus 10, out the opening 16.

The data storage apparatus 10 in accordance with a preferred embodiment of the present invention provides for the receiving, rotating and ejecting of a data storage medium 20 using magnetic fields. As a result, the data storage medium 20 is less susceptible to damage, the data storage apparatus 10 can more readily accommodate design tolerances of data storage media and maintain the efficient data reading therefrom or data writing thereto, and, if desired, a driven chuck and spindle assembly can be omitted from the data storage apparatus 10 thereby allowing for further minimization of the area occupied thereby.

The present invention is well suited for use in association with optically-written and optically-read data storage media. While the present invention was described in association with a data storage apparatus 10 amounting essentially to a CD-ROM system, the invention was so described merely to convey the concepts of the invention, and the invention may be applied to other rotating data storage systems.

While an embodiment of the present invention is shown and described herein, it is anticipated that those skilled in the art will be able to devise various modifications and equivalents without departing from the spirit and scope of the invention as defined by the appended claims. For example, it is possible to provide magnetic means 32 which are shaped substantially different than that which is described and depicted herein, and it is possible to provide for the reception, rotation and/or ejection of a data storage medium 20 using driver elements 52 in accordance with the present invention without utilizing the specific control of the electromagnetic driver elements 54 described and depicted herein. Because modifications such as this are possible without departing from the spirit and scope of the present invention, the present invention is not intended to be limited by the foregoing disclosure.

What is claimed is:

1. In a data storage apparatus, a drive mechanism for positioning and rotating a two-sided data storage medium having at least one control element thereon, said drive mechanism comprising:

at least one magnet adjacent each side of said data storage medium, each magnet applying a magnetic force to the at least one control element on the data storage medium thereby positioning said data storage medium on a magnetic bearing; and a plurality of driver elements adjacent said data storage medium, each of said driver elements capable of selectably attracting or repelling the at least one control element on the data storage medium thereby causing the data storage medium to rotate while the data storage medium is positioned on said magnetic bearing.

2. The drive mechanism of claim 1, wherein said magnet applies a repelling force to the at least one control element.

3. The drive mechanism of claim 1, wherein said drive mechanism is configured to non-contactably rotate said data storage medium while said data storage medium is suspended on said magnetic bearing.

4. The drive mechanism of claim 1, wherein the at least one control element on the data storage medium comprises at least one magnetic element having a magnetic polarity, said magnet comprising at least one magnetic bearing element, each of said at least one magnetic bearing elements having a magnetic polarity the same as the magnetic polarity of said magnetic element on the data storage medium, said at least one magnetic bearing elements exerting opposing forces on the at least one magnetic element on the data storage medium thereby creating said magnetic bearing on which the data storage medium moves and rotates.

5. The drive mechanism of claim 1, wherein said plurality of driver elements located adjacent said data storage medium comprise electromagnetic elements controlled by a variable electric current such that the magnetic field generated by said electromagnetic elements is modulateable to cause the data storage medium to rotate.

6. The drive mechanism of claim 5, wherein the at least one control element on said data storage medium comprises a plurality of spaced-apart magnetic elements, said electromagnetic elements being spaced-apart from each other in a spacing arrangement different from that of the magnetic elements on the data storage medium.

7. The drive mechanism of claim 6, wherein at least one of said electromagnetic elements is positioned and chargeable for attracting at least one of the magnetic elements on the data storage medium such that the data storage medium is magnetically pulled into a pre-determined position for rotation thereof.

8. The drive mechanism of claim 6, wherein at least one of said electromagnetic elements is positioned and chargeable for attracting at least one of the magnetic elements on the data storage medium such that the data storage medium is magnetically braked to limit rotation thereof.

9. The drive mechanism of claim 6, wherein at least one of said electromagnetic elements is positioned and chargeable for repelling at least one of the magnetic elements on the data storage medium such that the data storage medium is magnetically pushed from said pre-determined position.

10. In a data storage apparatus, a drive mechanism for positioning and rotating a two-sided data storage medium having at least one control element thereon, said drive mechanism comprising:

at least one repeller adjacent each side of said data storage medium repelling the at least one control element on the data storage medium thereby positioning said data storage medium on a magnetic bearing; and a plurality of driver elements adjacent said data storage medium, each of said driver elements capable of selectably attracting or repelling the at least one control element on the data storage medium thereby causing the data storage medium to rotate while the data storage medium is positioned on said magnetic bearing by said repeller.

11. The drive mechanism of claim 10, wherein said repeller comprises a magnet.

12. The drive mechanism of claim 10, wherein said drive mechanism is configured to non-contactably rotate said data storage medium while said data storage medium is suspended on said magnetic bearing.

13. In a data storage apparatus, a magnetic drive mechanism for rotating a two-sided, removable data storage medium having at least one magnetic element thereon, said drive mechanism comprising:

at least one magnetic bearing adjacent each side of the data storage medium applying a magnetic force to the at least one magnetic element on the data storage medium thereby positioning the data storage medium on a magnetic bearing; and a plurality of stationary magnetic driver elements located adjacent the data storage medium, each of said magnetic driver elements capable of selectably attracting or repelling the at least one magnetic element on the data storage medium thereby causing the data storage medium to rotate while the data storage medium is supported on the magnetic bearing by the at least one magnetic bearing.

14. The drive mechanism of claim 13, wherein the at least one magnetic element on the storage medium comprises at least one magnetic element having a magnetic polarity, each of said at least one magnetic bearing element having a magnetic polarity the same as the magnetic polarity of said magnetic element on the data storage medium, said at least one magnetic bearing element adjacent each side of the data storage medium exerting opposing forces on the at least one magnetic element on the data storage medium thereby creating a magnetic bearing on which the data storage medium moves and rotates.

15. The drive mechanism of in claim 13, wherein said plurality of stationary magnetic driver elements comprises electromagnetic elements controlled by a variable electric current such that the magnetic field generated by said electromagnetic elements is modulateable to cause the data storage medium to rotate.

16. The drive mechanism of claim 13, wherein said drive mechanism is configured to non-contactably rotate said data storage medium while said data storage medium is suspended on said magnetic bearing.

17. The drive mechanism of claim 15, wherein the at least one magnetic element on the data storage medium comprises a plurality of spaced-apart magnetic elements, said electromagnetic driver elements spaced-apart from each other in a spacing arrangement different from that of said magnetic elements on the data storage medium.

18. The drive mechanism of claim 17, wherein at least one of said electromagnetic elements is positioned and chargeable for attracting at least one of the magnetic elements on the data storage medium such that the data storage medium is magnetically pulled into a pre-determined position for rotation thereof.

19. The drive mechanism of claim 16, wherein at least one of said electromagnetic elements is positioned and chargeable for attracting at least one of the magnetic elements on the data storage medium such that the data storage medium is magnetically braked to limit rotation thereof.

20. The drive mechanism of claim 18, wherein at least one of said electromagnetic elements is positioned and chargeable for repelling at least one of the magnetic elements on the data storage medium such that the data storage medium is magnetically pushed from said pre-determined position.

21. In a data storage apparatus, a magnetic drive mechanism for rotating and centering a two-sided, removable data storage disc having a magnetic band thereon, said magnetic drive mechanism comprising:

at least one magnetic bearing adjacent each side of the data storage disc applying a magnetic force to at least a portion of the magnetic band on the data storage disc thereby positioning the data storage medium on a magnetic bearing; and a plurality of stationary electromagnetic driver elements located adjacent the circumference of the data storage disc, each of said electromagnetic driver elements capable of selectably attracting or repelling at least a portion of the magnetic band on the data storage disc thereby causing the data storage disc to rotate while the data storage disc is supported on the magnetic bearing by said at least one magnetic bearing and while the data storage disc is positioned by at least two of said electromagnetic driver elements.

22. The magnetic drive mechanism of claim 21, wherein the magnetic band on the data storage disc comprises at least one concentrated magnetic portion having a magnetic polarity, each of said at least one magnetic bearing element having a magnetic polarity the same as the magnetic polarity of the concentrated magnetic portion of the magnetic band on the data storage disc, said at least one magnetic bearing element adjacent each side of the data storage disc exerting opposing forces on the at least one concentrated magnetic portion of the magnetic band on the data storage disc thereby creating a magnetic bearing on which the data storage disc moves and rotates.

23. The magnetic drive mechanism of claim 21, wherein said electromagnetic driver elements are controlled by a variable electric current such that the magnetic field generated by said electromagnetic driver elements is modulateable to cause the data storage disc to rotate.

24. The magnetic drive mechanism of claim 21, wherein the concentrated magnetic portion of said magnetic band on the data storage disc comprises a plurality of spaced-apart concentrated magnetic elements, said electromagnetic drive elements being spaced-apart from each other in a spacing arrangement different from that of the concentrated magnetic elements of the magnetic band on the data storage disc.

25. The magnetic drive mechanism of claim 24, wherein at least one of said electromagnetic driver elements is positioned and chargeable for attracting at least one of the concentrated magnetic elements of the magnetic band on the data storage disc such that the data storage disc is magnetically pulled substantially into a predetermined position for rotation thereof.

26. The magnetic drive mechanism of claim 25, wherein at least one of said electromagnetic driver elements is positioned and chargeable for attracting at least one of the concentrated magnetic elements of the magnetic band on the data storage disc such that the data storage disc is magnetically braked to limit rotation thereof.

27. The magnetic drive mechanism of claim 25, wherein at least one of said electromagnetic driver elements is positioned and chargeable for repelling at least one of the concentrated magnetic elements of the magnetic band on the data storage disc such that the data storage disc is magnetically pushed from said predetermined position.

28. The drive mechanism of claim 21, wherein said drive mechanism is configured to non-contactably rotate said data storage medium while said data storage medium is suspended on said magnetic bearing.

29. A method of positioning and rotating a two-sided data storage medium in a data storage apparatus, said data storage medium having at least one control element thereon, said method comprising the steps of:

applying a magnetic force to at least one control element on the data storage medium thereby substantially positioning said storage medium substantially in a pre-determined position on a magnetic bearing for rotating said data storage medium; and selectably attracting and repelling the at least one control element on the data storage medium thereby causing the data storage medium to rotate while the data storage medium is substantially maintained in said pre-determined position on the magnetic bearing.

30. The method of claim 29, wherein said at least one control element on the data storage medium comprises at least one magnetic element having a magnetic polarity, said step of applying a magnetic force comprising repelling said at least one control element on the data storage medium and providing at least one magnetic bearing element adjacent each side of the data storage medium to exert opposing forces on the at least one magnetic element on the data storage medium thereby creating a magnetic bearing on which the data storage medium moves and rotates, each of said at least one magnetic bearing element having a magnetic polarity the same as the magnetic polarity of the magnetic element on the data storage medium.

31. The method of claim 29, said step of selectably attracting and repelling the at least one control element on the data storage medium comprising using variable electric currents to control a plurality of electromagnetic driver elements located adjacent the data storage medium such that the magnetic fields generated by said electromagnetic driver elements are modulated to cause the data storage medium to rotate.

32. The method of claim 31, wherein the at least one control element on the data storage medium comprises a plurality of spaced-apart magnetic elements, said electromagnetic elements being spaced-apart from each other in a spacing arrangement different from that of the magnetic elements on the data storage medium, said method further comprising sensing when the data storage medium is being inserted into the data storage apparatus, and charging at least one of said electromagnetic elements to attract at least one of the magnetic elements on the data storage medium such that the data storage medium is magnetically pulled substantially into a pre-determined position for rotation thereof.

33. The method of claim 31, wherein the at least one control element on the data storage medium comprises a plurality of spaced-apart magnetic elements, said electromagnetic elements being spaced-apart from each other in a spacing arrangement different from that of the magnetic elements on the data storage medium, said method further comprising charging at least one of said electromagnetic elements to attract at least one of the magnetic elements on the data storage medium such that the data storage medium is magnetically braked to limit rotation thereof.

34. The method of claim 31, wherein the at least one control element on the data storage medium comprises a plurality of spaced-apart magnetic elements, said electromagnetic elements being spaced-apart from each other in a spacing arrangement different from that of the magnetic elements on the data storage medium, said method further comprising charging at least one of said electromagnetic elements to repel at least one of the magnetic elements on the data storage medium such that the data storage medium is magnetically pushed from said pre-determined position.

35. A portable two-sided data storage disc capable of being rotated and substantially centered using a magnetic field, said data storage disc comprising at least one magnetic control element for allowing the rotating and substantially centering of said data storage disc using a data storage apparatus having a drive mechanism structured for effecting said rotation and centering of the data storage disc by applying one or more magnetic fields to said at least one magnetic control element.

36. A magnetic control element for application to a portable two-sided data storage disc, said magnetic control element comprising a magnetic band including spaced-apart concentrated magnetic portions, said magnetic band adapted for application to the data storage disc so that said data storage disc is rotatable and substantially centerable using a data storage apparatus having a drive mechanism applying one or more magnetic fields to the data storage disc.

37. The method of claim 29, wherein the step of selectably attracting and repelling the at least one control element on the data storage medium thereby causing the data storage medium to rotate while the data storage medium is substantially maintained in the pre-determined position on the magnetic bearing comprises non-contactably rotating the data storage medium while the data storage medium is suspended on the magnetic bearing.

38. A system for at least one of reading and writing data comprising:
   a two-sided data storage medium having at least one control element thereon; and
   a data storage apparatus including a drive mechanism for positioning and rotating the two-sided data storage medium having the at least one control element thereon, wherein said drive mechanism includes at least one magnet adjacent said data storage medium applying a magnetic force to the at least one control element on the data storage medium thereby positioning said data storage medium on a magnetic bearing, and wherein said drive mechanism includes a plurality of driver elements adjacent said data storage medium, each of said driver elements capable of selectably attracting or repelling the at least one control element on the data storage medium thereby causing the data storage medium to rotate while the data storage medium is positioned on the magnetic bearing.

39. The system of claim 38, wherein said drive mechanism is configured to non-contactably rotate said data storage medium while said data storage medium is suspended on said magnetic bearing.

40. The system of claim 38, wherein the drive mechanism is configured to suspend the data storage mechanism on the magnetic bearing without employing a chuck through a center hole of the data storage medium.

* * * * *